(12) United States Patent
Imazu et al.

(10) Patent No.: US 7,994,676 B2
(45) Date of Patent: Aug. 9, 2011

(54) RELUCTANCE MOTOR ROTOR AND RELUCTANCE MOTOR EQUIPPED WITH THE SAME

(75) Inventors: Tomoya Imazu, Yokohama (JP); Tsutomu Tanimoto, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 327 days.

(21) Appl. No.: 11/972,429

(22) Filed: Jan. 10, 2008

(65) Prior Publication Data

US 2008/0179987 A1    Jul. 31, 2008

(30) Foreign Application Priority Data

Jan. 30, 2007   (JP) ................. 2007-019609

(51) Int. Cl.
    *H02K 1/24*    (2006.01)
(52) U.S. Cl. ........................... 310/166; 310/257
(58) Field of Classification Search ........... 310/216.009, 310/216.081, 216.082, 216.125, 216.126, 310/216.057, 216.059, 216.024, 216.075, 310/166, 257, 263, 269
See application file for complete search history.

(56) References Cited

U.S. PATENT DOCUMENTS

| | | | | |
|---|---|---|---|---|
| 3,321,652 A | * | 5/1967 | Opel | .......................... 310/168 |
| 5,111,095 A | * | 5/1992 | Hendershot | ................... 310/168 |
| 5,365,137 A | * | 11/1994 | Richardson et al. | ... 310/216.039 |
| 5,623,177 A | * | 4/1997 | Dimatteo et al. | ............. 310/242 |
| 5,929,548 A | * | 7/1999 | Pinkerton et al. | ............. 310/166 |

FOREIGN PATENT DOCUMENTS

JP    2001-178092 A    6/2001

* cited by examiner

*Primary Examiner* — Quyen Leung
*Assistant Examiner* — Naishadh Desai
(74) *Attorney, Agent, or Firm* — Global IP Counselors, LLP

(57) ABSTRACT

A rotor is adapted to be used in a reluctance motor configured to generate a magnetic field around the rotor to form magnetic circuits passing through the rotor to produce a driving force corresponding to a torque generated by changes in magnetic reluctance in the magnetic circuits. The rotor includes a first salient pole group and a second salient pole group. The first salient pole group includes a plurality of first salient poles configured and arranged to be energized simultaneously with the first salient poles being spaced apart from each other in a circumferential direction of the rotor. The second salient pole group includes a plurality of second salient poles configured and arranged to be energized simultaneously with the second salient poles being spaced apart from each other in the circumferential direction of the rotor. The first salient pole group is magnetically insulated from the second salient pole group.

11 Claims, 5 Drawing Sheets

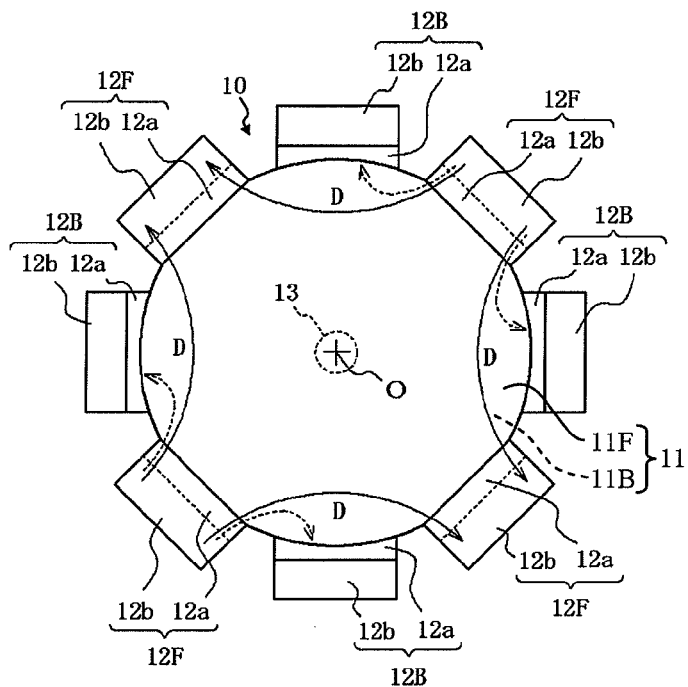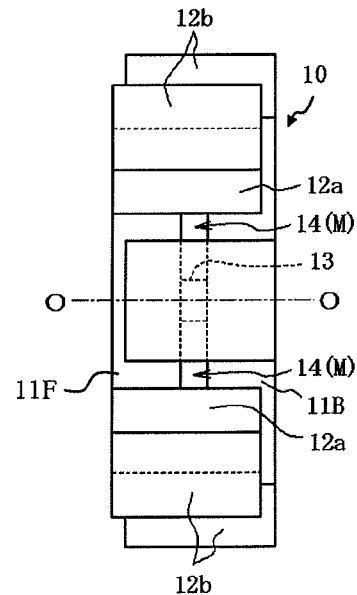
F I G. 1A  F I G. 1B
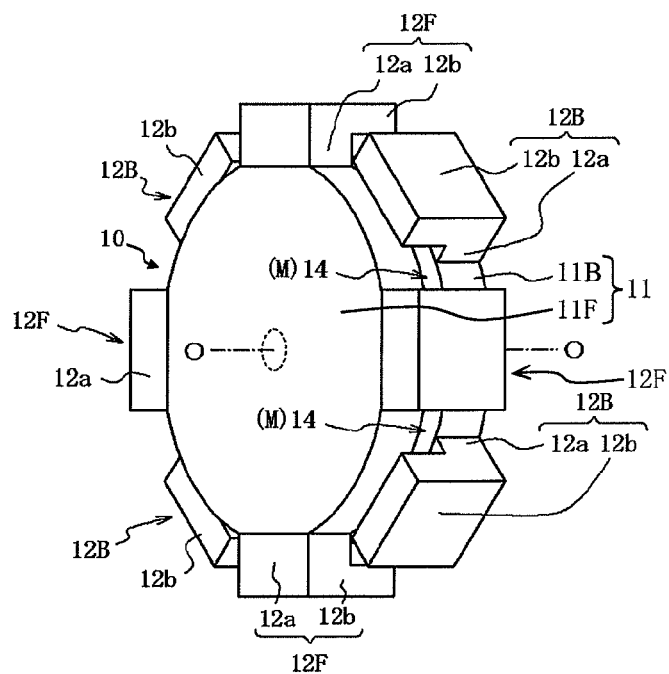
F I G. 1C

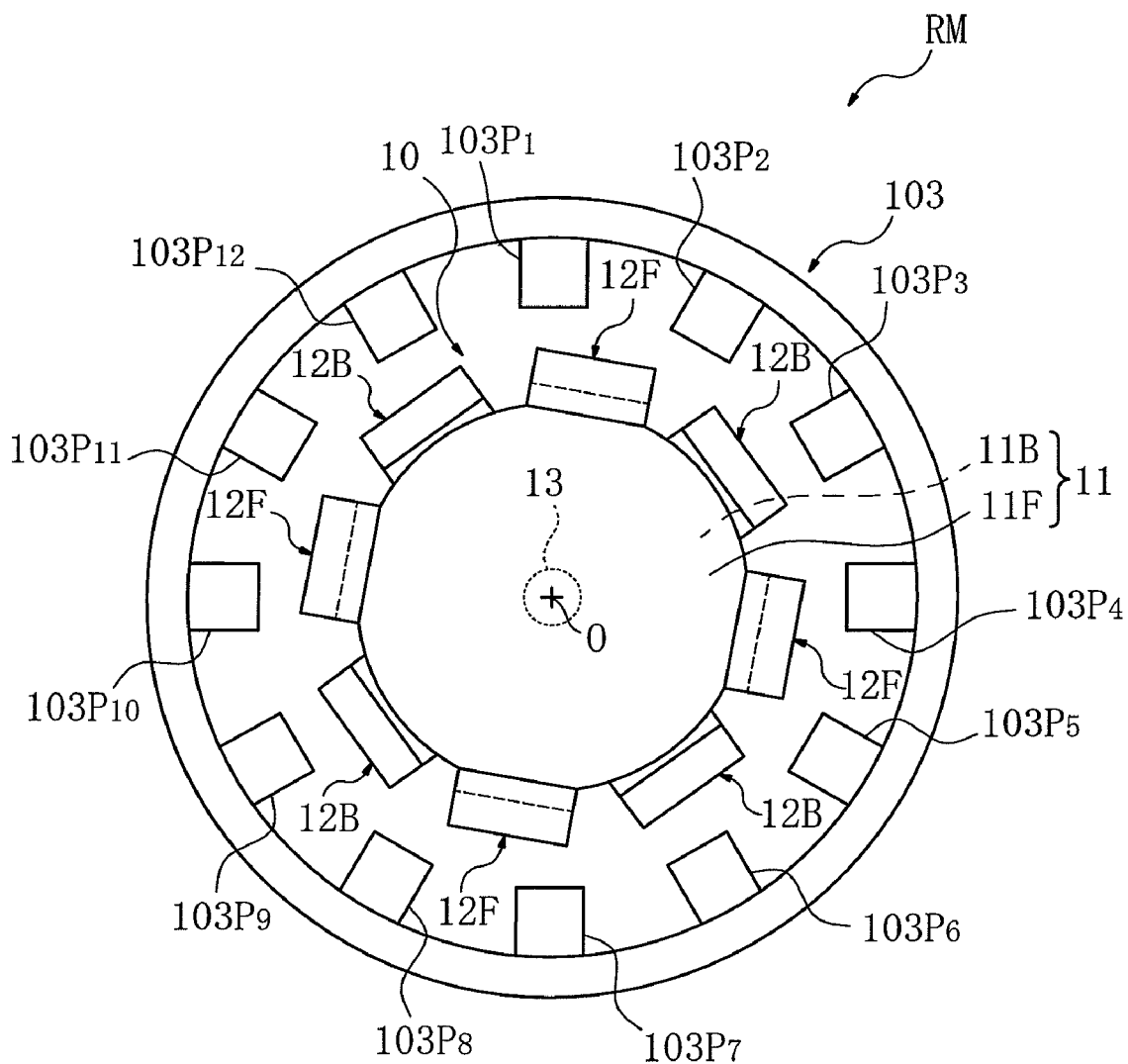
F I G. 1D

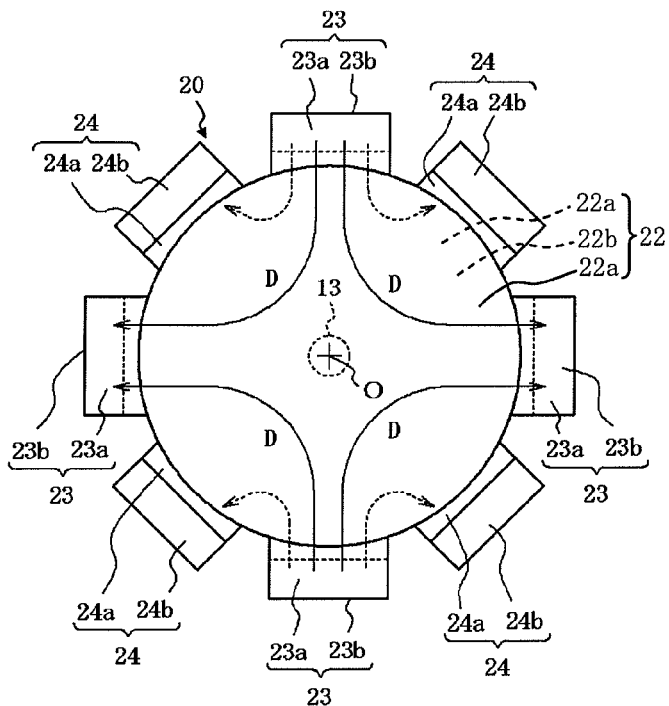
F I G. 2A
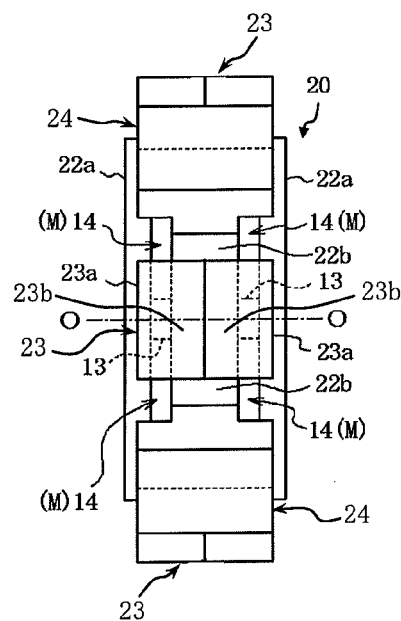
F I G. 2B
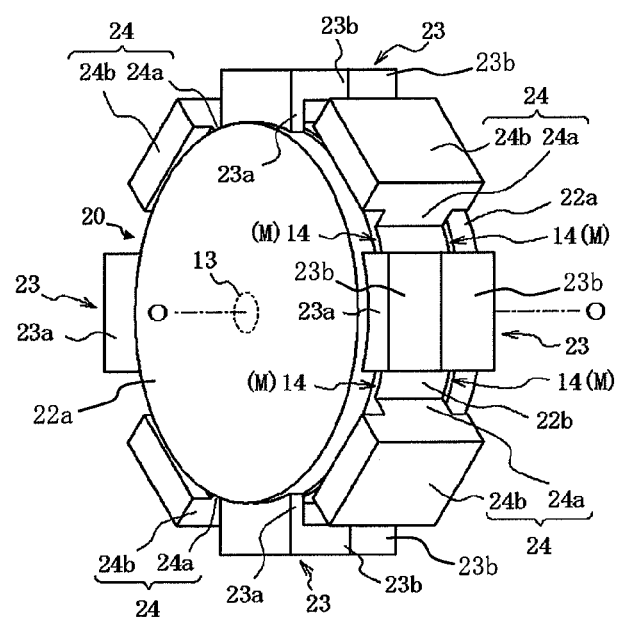
F I G. 2C

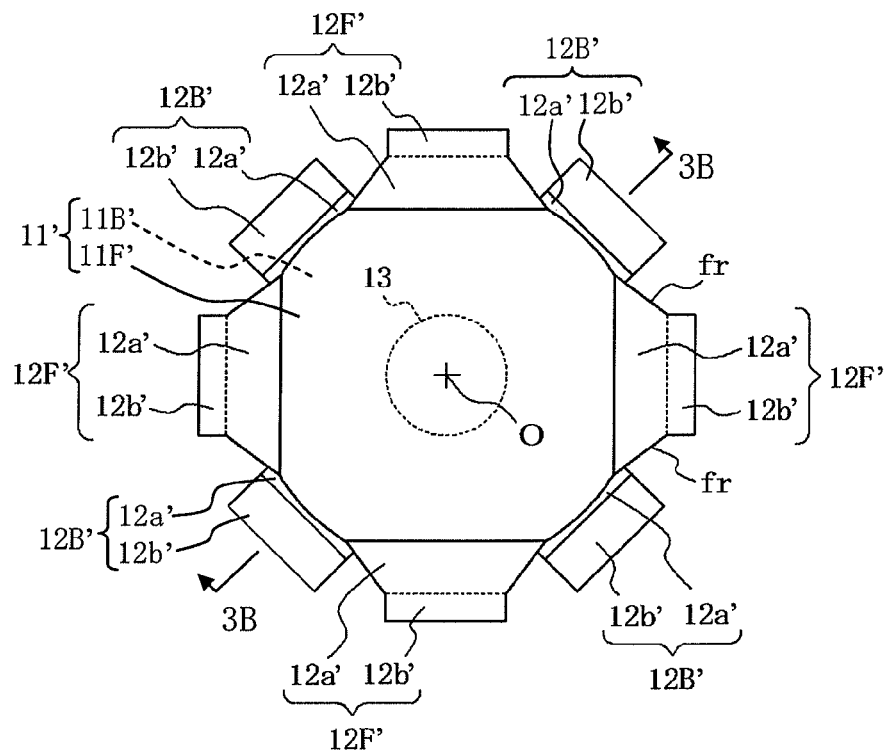
F I G. 3A
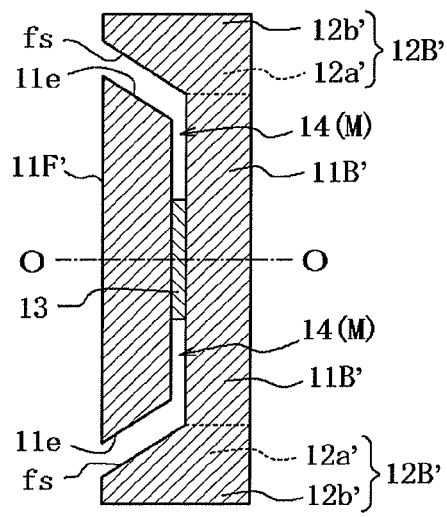
F I G. 3B

RELUCTANCE MOTOR ROTOR AND RELUCTANCE MOTOR EQUIPPED WITH THE SAME

CROSS-REFERENCE TO RELATED APPLICATIONS

This application claims priority to Japanese Patent Application No. 2007-019609, filed on Jan. 30, 2007. The entire disclosure of Japanese Patent Application No. 2007-019609 is hereby incorporated herein by reference.

BACKGROUND OF THE INVENTION

1. Field of the Invention

The present invention relates to a rotor for a reluctance motor and a reluctance motor equipped with the rotor.

2. Background Information

It has been proposed to use reluctance motors as drive sources for vehicles because the reluctance motors have a simple structure that does not require the use of permanent magnets and the reluctance motors are capable of rotating at high speeds. However, it is known that when a reluctance motor is operated at a high rotational speed or with a large torque output, the amount of torque ripple is large and the actual amount of torque obtained is smaller than a target amount of torque. Consequently, when a reluctance motor is operated at a high rotational speed or with a large torque output, it is necessary to increase or decrease the current of each phase at a high speed. However, since the speed at which the current is increased or decreased depends on the power source voltage of the device used to drive the reluctance motor, it is not possible to increase the speed at which the current is increased and decreased.

Thus, Japanese Laid-Open Patent Publication No. 2001-178092 discloses a conventional reluctance motor that can alleviate the problem of low torque output. More specifically, the conventional reluctance motor disclosed in this publication is configured to perform a so-called electrical angle advancing control in which electrical energizing of the coil is started at an electrical angle that is earlier (advanced) than a prescribed energizing timing in order to compensate for a wider interval during which the current increases or decreases.

In view of the above, it will be apparent to those skilled in the art from this disclosure that there exists a need for an improved reluctance motor rotor. This invention addresses this need in the art as well as other needs, which will become apparent to those skilled in the art from this disclosure.

SUMMARY OF THE INVENTION

With the electrical angle advancing control as described in the above-mentioned publication, since the electrical energizing is started at an angle where the inductance is small, the current rises quickly and the torque ripple is reduced. However, such a conventional reluctance motor will have the following problems.

FIG. 4 is a simplified schematic cross sectional view of a comparison example of a switched reluctance motor having a U-phase, a V-phase, and a W-phase showing the effects of a magnetic flux occurring at any given phase. In FIG. 4, a rotor 2 includes a plate member (hereinafter called a "back yoke") 2a having eight salient poles $2P_1$ to $2P_8$ connected integrally thereto. A stator 3 includes twelve salient poles $3P_1$ to $3P_{12}$. When the rotor 2 is positioned as shown in FIG. 4 and an electric current energizes coils (not shown) installed on each of the salient poles $3P_1$, $3P_4$, $3P_7$, and $3P_{10}$ of the stator 3, magnetic fluxes are generated in the directions indicated with the arrows $D_1$ and $D_2$ such that a magnetic circuit is formed in which the magnetic flux enters, for example, from the salient pole $2P_1$ of the rotor 2, passes through the back yoke $2a$, and returns to the stator 3 from the salient pole $2P_3$. As a result, a torque is generated in the direction indicated by the arrow $D_T$ and the rotor 2 can be rotated in the direction of the arrow $D_T$.

However, in reality, as exemplified with the salient pole $3P_1$ positioned at twelve o'clock in FIG. 4, a flux leakage path develops in the salient pole $2P_8$ adjacent the salient pole $2P_1$ of the rotor 2 and magnetic flux flows in the direction of the arrow $D_3$ toward the salient pole $3P_{12}$, which is an even-numbered salient pole adjacent to the salient pole $3P_1$. Similarly, a flux leakage path develops in the other salient pole $2P_2$ adjacent the salient pole $2P_1$ of the rotor 2 and magnetic flux flows in the direction of the arrow $D_4$ toward the odd-numbered salient pole $3P_3$.

The flux leakage paths cause a negative torque to develop which opposes the torque acting in the direction of the arrow $D_T$ and the size of the negative torque increases as the electrical angle is advanced. As a result, the torque output declines. This phenomenon becomes particularly marked when the reluctance motor is operated at a high rotational speed or with a large torque output. Accordingly, the problem of the torque output being low when the reluctance motor is operated at a high rotational speed or with a large torque output remains.

The present invention was conceived based on recognition of the problems described above. One object of the present invention is to provide a reluctance motor rotor and a reluctance motor equipped with the same that are configured to suppress the development of flux leakage paths that cause a negative torque to occur, and thereby improving the torque output of the reluctance motor.

In order to achieve the above object of the present invention, a rotor is adapted to be used in a reluctance motor configured to generate a magnetic field around the rotor to form magnetic circuits passing through the rotor to produce a driving force corresponding to a torque generated by changes in magnetic reluctance in the magnetic circuits. The rotor includes a first salient pole group and a second salient pole group. The first salient pole group includes a plurality of first salient poles configured and arranged to be energized simultaneously with the first salient poles being spaced apart from each other in a circumferential direction of the rotor. The second salient pole group includes a plurality of second salient poles configured and arranged to be energized simultaneously with the second salient poles being spaced apart from each other in the circumferential direction of the rotor. The first salient pole group is magnetically insulated from the second salient pole group.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 1A is a simplified schematic front view of a rotor in accordance with a first embodiment of the present invention;

FIG. 1B is a simplified schematic right side elevational view of the rotor illustrated in FIG. 1A in accordance with the first embodiment of the present invention;

FIG. 1C is a simplified schematic perspective view of the rotor illustrated in FIGS. 1A and 1B in accordance with the first embodiment of the present invention;

FIG. 1D is a simplified schematic front view of a reluctance motor that includes a stator and the rotor illustrated in FIGS. 1A to 1C in accordance with the first embodiment of the present invention;

FIG. 2A is a simplified schematic front view of a rotor in accordance with a second embodiment of the present invention;

FIG. 2B is a simplified schematic right side elevational view of the rotor illustrated in FIG. 2A in accordance with the second embodiment of the present invention;

FIG. 2C is a simplified schematic perspective view of the rotor illustrated in FIGS. 2A and 2B in accordance with the second embodiment of the present invention;

FIG. 3A is a simplified schematic front view of a rotor in accordance with a third embodiment of the present invention;

FIG. 3B is a simplified schematic cross sectional view of the rotor illustrated in FIG. 3A as taken along a section line 3B-3B of FIG. 3A in accordance with the third embodiment of the present invention.

DETAILED DESCRIPTION OF THE PREFERRED EMBODIMENTS

Figure 4:
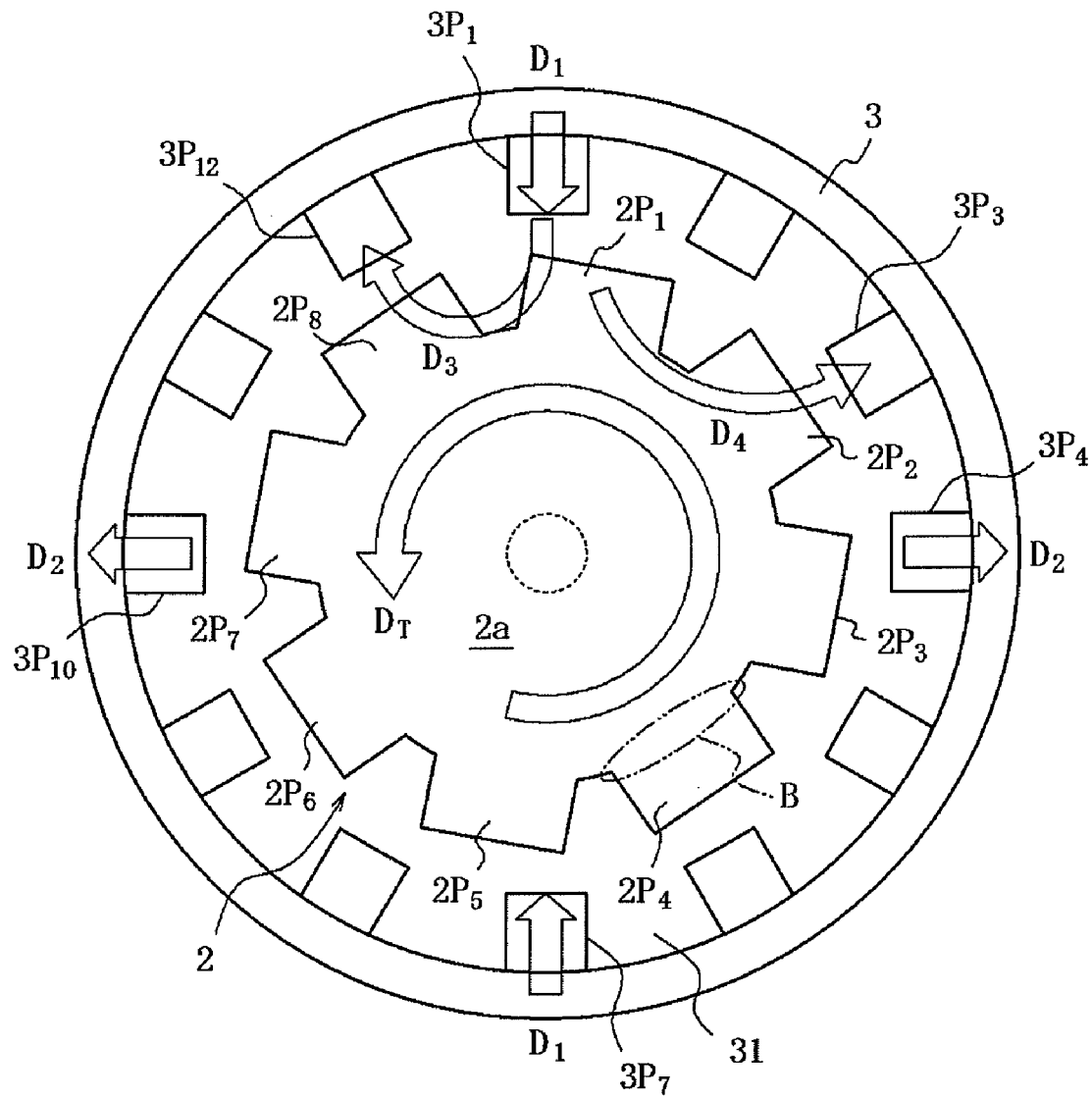
FIG. 4 is a simplified schematic cross sectional view of a comparison example of a switched reluctance motor having a U-phase, a V-phase, and a W-phase showing the effects of a magnetic flux occurring at any given phase.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1A to 1C, a reluctance motor rotor 10 (hereinafter simply called "rotor") and a reluctance motor equipped with the rotor 10 are explained in accordance with a first embodiment. FIGS. 1A to 1C are a simplified schematic front view, a simplified schematic right side view, and a simplified schematic perspective view, respectively, of the rotor 10 in accordance with the first embodiment.

As shown in FIGS. 1A to 1C, the rotor 10 includes a back yoke 11 having a front plate member 11F and a back plate member 11B attached together. In the first embodiment, the front and back plate members 11F and 11B preferably have an identical shape and structure. Both of the front and back plate members 11F and 11B are arranged to be fixedly coupled coaxially to a rotational shaft of a reluctance motor RM along a rotational axis O shown in FIGS. 1A to 1D.

In the first embodiment, the front plate member 11F of the back yoke 11 includes four salient poles 12F connected to the front plate member 11F along the outer periphery thereof with the salient poles 12F being spaced apart from each other in a circumferential direction of the rotor 10. Also, the back plate member 11B of the back yoke 11 includes four salient poles 12B connected to the back plate member 11B along the outer periphery thereof with the salient poles 12B being spaced apart from each other in the circumferential direction of the rotor 10.

As shown in FIGS. 1A and 1C, each of the salient poles 12F of the front plate member 11F has a proximal portion 12a that connects to the front plate member 11F and an outer wall 12b that extends from the proximal portion 12a along the direction of the rotational axis O toward the back plate member 11B. Likewise, each of the salient poles 12B of the back plate member 11B has the proximal portion 12a that connects to the back plate member 11B and the outer wall 12b that extends from the proximal portion 12a along the direction of the rotational axis O toward the front plate member 11F.

As shown in FIG. 1A, the back yoke 11 of the rotor 10 is formed by assembling the front and back plate members 11F and 11B together such that the respective salient poles 12F and 12B are disposed alternately in the circumferential direction of the rotor 10. Thus, the front and back plate members 11F and 11B are assembled together so that the salient poles 12F and 12B do not overlap each other as viewed in the direction of the rotational axis O. In the first embodiment, the front and back plate members 11F and 11B are connected integrally together with a connecting member 13 being interposed therebetween such that a gap 14 (empty, open space) is formed between the front and back plate members 11F and 11B as shown in FIGS. 1B and 1C. Moreover, in the first embodiment, it is preferable to provide a member made of a material M having a high magnetic reluctance, particularly a non-magnetic material M, in the gap 14. In other words, the front plate member 11F and the back plate member 11B are assembled together so that the salient poles 12F are magnetically insulated from the salient poles 12B.

The front plate member 11F of the back yoke 11 is arranged such that the four salient poles 12F are connected to the front plate member 11F to form a salient pole group (first salient pole group) that are energized simultaneously. Thus, a magnetic circuit system (first magnetic circuit system) is formed by the salient poles 12F of the front plate member 11F as indicated with the arrows D in FIG. 1A. The back plate member 11B is also arranged such that the four salient poles 12B are connected to the back plate member 11B to form a salient pole group (second salient pole group) that are energized simultaneously. Thus, a magnetic circuit system (second magnetic circuit system) is formed by the salient poles 12B. Since the salient poles 12F are connected to the front plate member 11F and the salient poles 12B are connected to the back plate member 11B, which is magnetically insulated from the front plate member 11F, a flux leakage path between, for example, one of the salient poles 12F and an adjacent one of the salient poles 12B as indicated with broken-line arrows D in FIG. 1A is interrupted. Therefore, a short circuit can be prevented from occurring in the rotor 10.

In other words, although the rotor 10 has a total of eight salient poles 12F and 12B, four of them (i.e., the salient poles 12F) are connected to the front plate member 11F to form a group of salient poles that are energized simultaneously, and the other four of them (i.e., the salient poles 12B) are connected to the back plate member 11B to form another group of salient poles that are energized simultaneously. Thus, two separate magnetic circuit systems are formed in the back yoke 11 of the rotor 10. Since the gap 14 or the material M having a high magnetic reluctance (preferably a non-magnetic material) is provided between the front and back plate members 11F and 11B to magnetically insulate the front and back plate members 11F and 11B, the effects of magnetic flux leakage are greatly reduced. For example, when the salient poles 12F are energized, the resulting magnetic flux has a much smaller effect on the salient poles 12B than it would if the gap 14 or the material M was not provided between the front and back plate members 11F and 11B. As a result, the formation of flux leakage paths in the salient poles 12B when the salient poles 12F are energized can be greatly reduced. Similarly, when the salient poles 12B are energized, the formation of flux leakage paths in the salient poles 12F can be greatly reduced.

Therefore, as shown in FIG. 1D, when the rotor 10 according to the first embodiment is installed in the reluctance motor RM having a stator 103 with twelve stator salient poles 103P$_1$ to 103P$_{12}$ (which is similar to the stator 3 of the comparison example shown in FIG. 4), the development of flux leakage paths that cause a negative torque to occur can be suppressed when the reluctance motor is operated at a high rotational speed or with a large torque output. As a result, the torque output of the reluctance motor (i.e., the torque decline that would otherwise result from the negative torque) can be improved in an effective manner.

Additionally, the back yoke 11 of the rotor 10 includes the front and back plate members 11F and 11B each having a plurality of the salient poles 12F and 12B, respectively, and the front and back plate members 11F and 11B are assembled together such that the respective salient poles 12F and 12B are disposed alternately in the circumferential direction of the rotor 10 and two separate magnetic circuit systems are formed in the rotor 10. As a result, identical members can be used as the front and back plate members 11F and 11B. Thus, the cost of manufacturing can be reduced because common (the same) members are used for both the front and back plate members 11F and 11B of the back yoke 11.

It is possible for each of the salient poles 12F and 12B to include only the proximal portion 12a. However, in the first embodiment, each of the salient poles 12F and 12B also preferably includes the outer wall 12b as illustrated in FIGS. 1A to 1C. As a result, larger magnetic circuits can be formed in the back yoke 11 of the rotor 10.

When the back yoke 11 of the rotor 10 in accordance with the first embodiment includes the front and back plate members 11F and 11B with the gap 14 being formed therebetween, it is necessary to connect the front and back plate members 11F and 11B of the back yoke 11 together with the connecting member 13. In such a case, it is preferable to take into account that a flux leakage path could develop through the connecting member 13. Thus, the connecting member 13 is preferably made of the material M having a high magnetic reluctance (particularly a non-magnetic material) to connect the back yokes 11F and 11B together. Therefore, the formation of flux leakage paths that cause negative torque to develop can be suppressed even further.

Second Embodiment

Referring now to FIGS. 2A to 2C, a rotor 20 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

FIGS. 2A to 2C are a simplified schematic front view, a simplified schematic right side view, and a simplified schematic perspective view, respectively, of the rotor 20 in accordance with the second embodiment.

In the second embodiment, a back yoke 22 of the rotor 20 has three plate members including a pair of outer plate members 22a (first and third plate members) and an inner plate member 22b (second plate member). The outer plate members 22a share a common shape (i.e., the outer plate members 22a are shaped the same). The inner plate member 22b is disposed between the outer plate members 22a as shown in FIGS. 2B and 2C.

More specifically, each of the outer plate members 22a has four proximal portions 23a connected to the outer plate member 22a to be circumferentially arranged around a rotational axis O with the proximal portions 23a being spaced apart from each other. An outer wall 23b extends from each of the proximal portions 23a along the direction of the rotational axis O. The outer plate members 22a are coupled together so that the proximal portions 23a of each of the outer plate members 22a are aligned as viewed in the direction of the rotational axis O, and the outer walls 23b of the outer plate members 22a are connected to form a plurality of salient poles 23 (in this example, four salient poles 23 are formed) as shown in FIGS. 2A to 2C.

The inner plate member 22b has four salient poles 24 that are circumferentially arranged along the outer periphery of the inner plate member 22b around the rotational axis O with the salient poles 24 being spaced apart from each other t. As shown in FIGS. 2A and 2C, each of the salient poles 24 has a proximal portion 24a that connects to the inner plate member 22b and an outer wall 24b that extends from the proximal portion 24a along the direction of the rotational axis O towards both of the outer plate members 22a.

In the rotor 20 of the second embodiment, the back yoke 22 is formed by connecting the two outer plate members 22a together with the inner plate member 22b arranged therebetween such that the salient poles 23 of the outer plate members 22a and the salient poles 24 of the inner plate member 22b, respectively, are disposed alternately in the circumferential direction of the rotor 20. Thus, the salient poles 23 and 24 are arranged so as not to overlap each other as viewed in the direction of the rotational axis O. Each of the outer plate members 22a is connected to the inner plate member 22b with the connecting members 13 being interposed therebetween such that the gap 14 is formed between each of the outer plate members 22a and the inner plate member 22b as shown in FIGS. 2B and 2C. Similarly to the first embodiment, it is preferable to provide a member made of the material M having a high magnetic reluctance, particularly a non-magnetic material M, in the gap 14. Thus, the inner plate member 22b is magnetically insulated from each of the outer plate members 22a in the second embodiment.

The outer plate members 22a of the back yoke 22 in the second embodiment are arranged such that the four salient poles 23 form a salient pole group (first salient pole group) that are energized simultaneously and form a magnetic circuit system (first magnetic circuit system), as indicated with the arrows D in FIG. 2A. The inner plate member 22b is also arranged such that the four salient poles 24 form a salient pole group (second salient pole group) that are energized simultaneously and form a magnetic circuit system (second magnetic circuit system). Since the salient poles 23 and the salient poles 24 each connect to a different plate member (i.e., the outer plate members 22a or the inner plate member 22b), a flux leakage path between, for example, one of the salient poles 23 and an adjacent one of the salient poles 24 as shown in the broken-line arrows in FIG. 2A is interrupted. Thus, a short circuit is prevented from occurring in the rotor 20.

In other words, although the rotor 20 has a total of eight salient poles 23 and 24, four of them (i.e., the salient poles 23) are connected to the outer plate members 22a to form a group of salient poles that are energized simultaneously, and the other four of them (i.e., the salient poles 24) are connected to the inner plate member 22b to form another group of salient poles that are energized simultaneously. Thus, two separate magnetic circuit systems are formed in the back yoke 22 of the rotor 20. Since the gap 14 or the material M having a high magnetic reluctance (preferably a non-magnetic material) is provided between each of the outer plate members 22a and the inner plate member 22b, the effects of magnetic flux leakage are greatly reduced. For example, when the salient poles 23 are energized, the resulting magnetic flux has a much smaller effect on the salient poles 24 than it would if the gap 14 or the material M was not provided. As a result, the formation of flux leakage paths in the salient poles 24 when the salient poles 23 are energized can be greatly reduced. Similarly, when the salient poles 24 are energized, the formation of flux leakage paths in the salient poles 23 can be greatly reduced.

Therefore, when the rotor 20 according to the second embodiment is used in a reluctance motor having the stator 103 in the similar manner in the first embodiment as shown in FIG. 1D, the development of flux leakage paths that cause a negative torque to occur can be suppressed when the reluctance motor is operated at a high rotational speed or with a large torque output. As a result, the torque output of the reluctance motor (i.e., the torque decline that would otherwise result from the negative torque) can be improved in an effective manner.

Moreover, the rotor 20 includes three plate members (i.e., the outer plate members 22a and the inner plate member 22b) to form a plurality of salient poles 23 and 24. Two of the plate members (i.e., the outer plate members 22a) are connected together such that the proximal portions 12a and the outer walls 12b thereof are aligned with one another as viewed in the direction of the rotational axis O to form the salient poles 23. The inner plate member 22b is disposed between the outer plate members 22a such that adjacent salient poles 23 and 24 of the outer plate members 22a and the inner plate member 22b are disposed alternately in the circumferential direction of the rotor 20. With such an arrangement, the overall structural strength of the rotor 20 in accordance with the second embodiment can be further increased. However, it will be apparent to those skilled in the art from this disclosure that the basic idea of the rotor 20 in accordance with the second embodiment can be realized so long as the rotor 20 comprises three or more plate members each having a plurality of salient poles and the plate members are assembled together such that circumferentially adjacent salient poles of each of the plate members are disposed alternately in the circumferential direction of the rotor 20. In such a case, even if the salient poles are provided in a cantilevered structure, the overall structural strength of the rotor can be increased because the lengths of the salient poles can be shortened.

Third Embodiment

Referring now to FIGS. 3A and 3B, a rotor 30 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a single prime (').

FIG. 3A is a simplified schematic front view of the rotor 30 in accordance with the third embodiment of the present invention. FIG. 3B is a cross sectional view of the rotor 30 taken along a section line 3B-3B of FIG. 3A. The rotor 30 of the third embodiment differs from the rotor 10 of the first embodiment in that a back yoke 11' of the rotor 30 in the third embodiment includes front and back plate members 11F' and 11B' that have substantially square shapes in the front view as shown in FIG. 3A, which is made up of straight lines and curves. Similarly to the first embodiment, the front and back plate members 11F' and 11B' are preferably coupled together via the connecting member 13 with the gap 14 or the material M being interposed therebetween so that the front and back plate members 11F' and 11B' are magnetically insulated from each other.

As shown in FIG. 3A, the front and back plate members 11F' and 11B' include a plurality of salient poles 12F' and a plurality of salient poles 12B', respectively. The front and back plate members 11F' and 11B' are assembled together such that the salient poles 12F' and the salient poles 12B' are disposed alternately in the circumferential direction of the rotor 30 as shown in FIG. 3A. Each of the salient poles 12F' and 12B' includes a proximal portion 12a' and an outer wall portion 12b' extending from the proximal portion 12a'.

Moreover, in the third embodiment, each of the proximal portions 12a' of the salient poles 12F' is arranged to gradually widen in the circumferential direction of the rotor 30 as one moves closer to the rotational axis O as shown in FIG. 3A. More specifically, as shown in the rightward salient pole 12F' in FIG. 3A as an example, both side surfaces fr of the proximal portion 12a' are slanted generally along the circumferential direction of the rotor 30 so that a distance between the side surfaces fr becomes larger as one moves closer to the rotational axis O.

As in the comparison example shown in FIG. 4, when the reluctance motor rotor has an even number of salient poles $2P_1$ to $2P_8$ that are divided into one group of evenly numbered salient poles $2P_2$, $2P_4$, $2P_6$, and $2P_8$ and another group of oddly numbered salient poles $2P_1$, $2P_3$, $2P_5$, and $2P_7$, magnetic saturation tends to occur at the proximal portions of the salient poles $2P_1$ to $2P_8$. An example of the proximal portion of one of the salient poles $2P_1$ to $2P_8$ is indicated with an area B in FIG. 4.

However, in the rotor 30 of the third embodiment, this magnetic saturation can be prevented by making the external shape of each of the salient poles 12F' of the front plate members 11F' such that the proximal portion 12a' of the salient poles 12F' gradually widens in the circumferential direction of the rotor 30, thereby increasing the cross sectional area of the proximal portion 12a' of each of the salient poles 12F'.

More specifically, in the rotor 30 of this invention, the proximal portion 12a' of each of the salient poles 12F' has the two side surfaces fr configured such that the proximal portion 12a' has the shape that gradually widens in a circumferential direction of the rotational axis O. Consequently, the cross section of the salient pole 12F' as taken along a plane perpendicular to the rotational axis O is larger at the proximal portion 12a' and magnetic saturation can be prevented at the proximal portion 12a'.

Additionally, as shown in FIG. 3B, each of the salient poles 12B' of the back plate member 11B' has an axially oriented surface fs so that the proximal portion 12b' of the salient pole 12B' has a shape that widens gradually in the direction of the rotational axis O as one moves away from the rotational axis O. On the other hand, as shown in FIG. 3B, the front plate member 11F' includes inner edge portions 11e provided in positions circumferentially between adjacent ones of the salient poles 12F' so as to face opposite the salient poles 12B' of the back plate member 11B'. Each of the inner edge portions 11e is slanted so as to be parallel to the axially oriented face fs of the respective salient pole 12B' to form an escape with respect to the external shape of the respective salient pole 12B'.

In other words, in the rotor 30 of the third embodiment, the shape of each of the salient poles 12B' of the back plate member 11B' is arranged such that the proximal portion 12a' of the salient pole 12B' widens gradually in the direction of the rotational axis O, and the shape of each of the inner edge portions 11e of the front plate member 11F' is arranged to form an escape with respect to the external shapes of the respective salient poles 12B' in order to prevent an interference between the front plate member 11F' and the back plate member 11B'. As a result, the strength of the cantilevered structure of the salient poles 12B' can be improved.

Although, in the rotor 30 of the third embodiment, the shapes of the salient poles 12F' of the front plate member 11F' are different from the shapes of the salient poles 12B' of the back plate member 11B', it is also acceptable to form the front and back plate members 11F' and 11B' to have the same shape as is done in the first embodiment.

In the rotor 30 in accordance with the third embodiment, the salient poles 12F' and 12B' of the rotor 30 are connected into separate groups of salient poles (i.e., the salient poles 12F' and the salient poles 12B') that are energized simultaneously so as to form different magnetic circuit systems (first and second magnetic circuit systems) in the rotor 30. Moreover, the gap 14 or the material M having a high magnetic reluctance is disposed between the magnetic circuit systems formed by the front plate member 11F' and the back plate member 11B'. The material M is preferably a non-magnetic material. With the third embodiment, when a particular salient pole group (i.e., the salient poles 12F' or the salient poles 12B') is energized, the influence of the magnetic flux on the other salient pole group can be greatly reduced. As a result, the formation of leakage flux paths in the other salient pole group can be greatly reduced.

Therefore, when the rotor 30 according to the third embodiment is used in a reluctance motor having the stator 103 in a similar manner as shown in FIG. 1D, the development of flux leakage paths that cause a negative torque to occur can be suppressed when the reluctance motor is operated at a high rotational speed or with a large torque output. As a result, the torque output of the reluctance motor (i.e., the torque decline that would otherwise result from the negative torque) can be improved in an effective manner.

Moreover, the reluctance motor provided with one of the rotors 10, 20 and 30 in accordance with the first to third embodiments is preferably provided with the stator 3 having the salient poles $3P_1$ to $3P_{12}$ as exemplified in FIG. 4. The rotors 10, 20 or 30 and the stator 3 are preferably arranged such that the ratio of the number of the salient poles of the rotor 10, 20 or 30 and the number of salient poles of the stator 3 is 2:3. Consequently, a reluctance motor can be obtained which has superior output efficiency and exhibits the excellent effects described above.

In the first to third embodiments, each of the rotors 10, 20 and 30 is explained to have an even number of salient poles with the salient poles being separated into a group of evenly numbered salient poles and a group of oddly numbered salient poles that are disposed alternately in the circumferential direction of the rotor 10, 20 or 30, each group of salient poles being arranged to be magnetically energized separately. However, it will be apparent to those skilled in the art from this disclosure that the number of salient poles and the method of exciting the salient poles can be varied from the illustrated embodiments. Furthermore, the various constituent features of the illustrated embodiments can be combined and interchanged as necessary in accordance with the particular objective and application at hand.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A reluctance motor rotor configured to generate a magnetic field around the reluctance motor rotor to form magnetic circuits passing through the reluctance motor rotor to produce a driving force corresponding to a torque generated by changes in magnetic reluctance in the magnetic circuits, the reluctance motor rotor comprising:

a first salient pole group including a plurality of first electrically energizable salient poles configured and arranged to be energized simultaneously with the first electrically energizable salient poles being spaced apart from each other in a circumferential direction of the reluctance motor rotor; and a second salient pole group including a plurality of second electrically energizable salient poles configured and arranged to be energized simultaneously with the second electrically energizable salient poles being spaced apart from each other in the circumferential direction of the reluctance motor rotor, the first salient pole group being magnetically insulated from the second salient pole group.

2. The reluctance motor rotor as recited in claim 1, further comprising a first plate member having the first electrically energizable salient poles of the first salient pole group, and a second plate member having the second electrically energizable salient poles of the second salient pole group, the first and second plate members being assembled together such that the first and second electrically energizable salient poles are disposed alternately in the circumferential direction of the reluctance motor rotor with one of a gap and a high magnetic reluctance material being interposed between the first and second plate members in a direction of a rotational axis of the reluctance motor rotor.

3. The reluctance motor rotor as recited in claim 2, further comprising
a third plate member having a third salient pole group including a plurality of third electrically energizable salient poles that are spaced apart from each other in the circumferential direction of the reluctance motor rotor, the third plate member being assemble together with the first and second plate members with the second plate member being disposed between the first and third plate members such that the third electrically energizable salient poles do not overlap at least the second electrically energizable salient poles as viewed in the direction of the rotational axis of the reluctance motor rotor.

4. The reluctance motor rotor as recited in claim 3, wherein the third plate member is arranged with respect to the first plate member such that each of the third electrically energizable salient poles is aligned and connected to a corresponding one of the first electrically energizable salient poles as viewed in the direction of the rotational axis of the reluctance motor rotor so that the first and third electrically energizable electrically energizable salient poles are energized simultaneously.

5. The reluctance motor rotor as recited in claim 1, wherein each of the first and second salient electrically energizable poles includes a proximal portion and an outer wall extending from the proximal portion in a direction substantially parallel to the rotational axis of the reluctance motor rotor.

6. The reluctance motor rotor as recited in claim 2, wherein the first and second plate members are assembled together with the material having the high magnetic reluctance being interposed between the first and second plate members in the direction of the rotational axis of the reluctance motor rotor.

7. The reluctance motor rotor as recited in claim 2, wherein at least each of the first electrically energizable salient poles of the first plate member has a proximal portion that gradually widens in the circumferential direction of the reluctance motor rotor as moving closer to the rotational axis of the reluctance motor rotor.

8. The reluctance motor rotor as recited in claim 2, wherein
at least each of the second electrically energizable salient poles of the second plate member has a proximal portion that gradually widens in the direction of the rotational axis of the reluctance motor rotor as moving away from the rotational axis of the reluctance motor rotor, and
the first plate member has a plurality of inner edge portions disposed between adjacent ones of the first electrically energizable salient poles at positions corresponding to the proximal portions of the second electrically energizable salient poles, the inner edge portions of the first plate member being dimensioned to avoid an interference between the first plate member and the proximal portions of the second electrically energizable salient poles.

9. A reluctance motor including the reluctance motor rotor as recited in claim 1, the reluctance motor comprising:
a stator having a plurality of stator electrically energizable salient poles to selectively generate the magnetic field around the reluctance motor rotor,
a ratio of a total number of the first and second electrically energizable salient poles of the reluctance motor rotor and a number of the stator electrically energizable salient poles of the stator being 2:3.

10. The reluctance motor rotor as recited in claim 2, wherein
the gap is interposed between the first and second plate members; and
the first and second electrically energizable salient poles extend over and are spaced away from an outermost perimeter of the gap as defined by outermost perimeters of the first and second plate members.

11. The reluctance motor rotor as recited in claim 2, wherein
the high magnetic reluctance material is interposed between the first and second plate members; and
the first and second electrically energizable salient poles extend over and are spaced away from an outermost perimeter of the high magnetic reluctance material.

* * * * *